United States Patent

Ha

[11] Patent Number: 4,657,057
[45] Date of Patent: Apr. 14, 1987

[54] SAFETY TIRE VALVE FOR CONTROLLING SPEED OF VEHICLE

[76] Inventor: Jin S. Ha, 12750-14 Centralia St., Lakewood, Calif. 90715

[21] Appl. No.: 838,833

[22] Filed: Mar. 12, 1986

[51] Int. Cl.$^4$ ............................................. B60C 29/00
[52] U.S. Cl. ............................ 152/415; 301/5 VH; 137/57; 180/282
[58] Field of Search ............... 152/415; 180/282, 287; 137/50, 53, 56, 57, 59, 223; 301/5 VH

[56] References Cited

U.S. PATENT DOCUMENTS

| | | | |
|---|---|---|---|
| 2,470,873 | 5/1949 | Seitz | 152/415 |
| 2,737,223 | 3/1956 | Plath | 152/415 |
| 3,003,539 | 10/1961 | Tone | 152/415 |
| 3,603,332 | 9/1971 | Canale | 137/57 X |
| 4,375,200 | 3/1983 | Bertani et al. | 180/287 X |

Primary Examiner—David A. Scherbel
Attorney, Agent, or Firm—Birch, Stewart, Kolasch & Birch

[57] ABSTRACT

A safety air valve for a tire comprising a casing adapted to be vertically mounted to a rim of a tire, the casing defining an air channel extending therethrough, the air channel containing an internal shoulder which extends into the air channel, a valve extending through the air channel for opening and closing the flow of air through the channel, the valve including a valve stem containing a valve head at one end thereof, the valve head being provided with a lip which is adapted to engage the shoulder in the air channel through the movement of the valve head through the air channel, a spring operatively associated with the valve stem to bias the valve head in closed position with the lip in engagement with the shoulder, and a weight member attached to the valve head whereby upon the achieving of excessive speed and correspondingly excessive tire rotation the centrifugal force on the weight member causes the valve to open against the bias of the spring.

4 Claims, 6 Drawing Figures

SAFETY TIRE VALVE FOR CONTROLLING SPEED OF VEHICLE

BACKGROUND OF THE INVENTION

The present invention relates to a speed control device. More particularly, the present invention is directed to a tire safety air-valve which automatically opens to release air from the tire and cause it to become flat when the tires rotation exceeds a given value corresponding to an excess speed. For example, many accidents are caused by driving at excessive speed due to intoxicated drivers, and other drivers acting irresponsibly. Under such driving conditions and when using the tire safety system of the present invention, accidents caused by speed can be avoided because the tires of such vehicles driven at excessive speed will automatically become flat. In many of the safety systems of vehicles known in the art, the mechanisms are very complicated rendering them unacceptable for commercial use or availability. Also, most systems do not self-operate automatically without driver involvement.

SUMMARY AND OBJECTS OF THE INVENTION

Accordingly, it is an object of the present invention to provide a tire safety device which is simple in construction and relatively inexpensive to manufacture.

Another object of the present invention is to provide a device which automatically releases air from a tire through a safety valve when the tire rotation exceeds that corresponding to an excessive vehicle speed.

A further object of the present invention is to provide a device which automatically stops the flow of air from the tire through the safety valve when the rotation of the tire returns to a rotation corresponding to an acceptable rate of speed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention provides a tire air valve closure which is opened or closed automatically by the rotating speed of the tire, that is, when a vehicle is operated at a speed exceeding the legal speed, the tire will become flat automatically unless the vehicle is returned to an acceptable speed. Accordingly, the tire safety system of the present invention prevents an unruly driver from driving at excessive speed whereby many accidents can be substantially avoided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
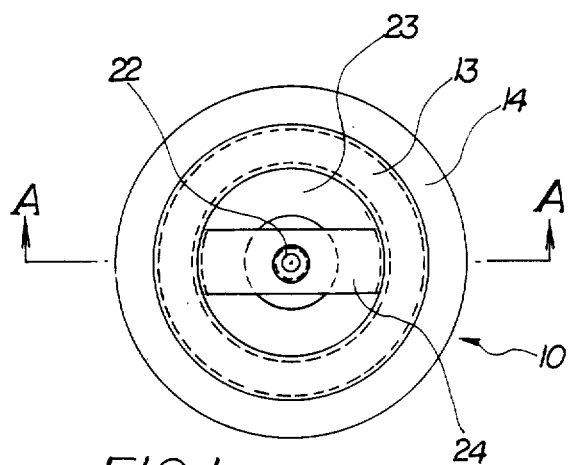
FIG. 1 is a top plan view of the tire safety device of the present invention.
Figure 2:
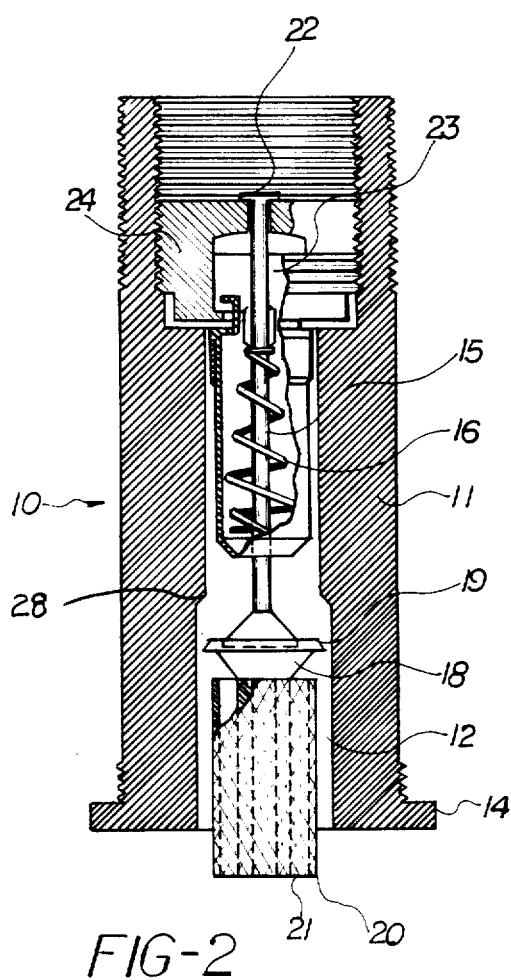
FIG. 2 is a cross-sectional view of FIG. 1, taken along lines A,A showing the valve in an open position.
Figure 4:
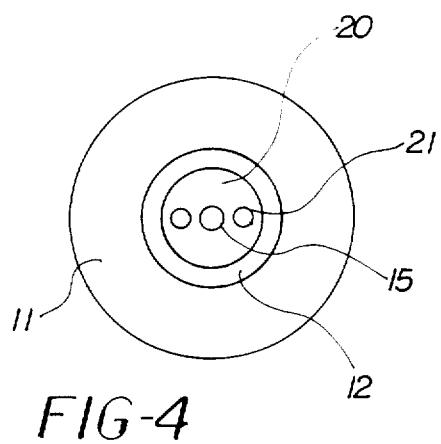
FIG. 4 is a bottom plan view of the tire safety valve of the present invention.
Figure 5:
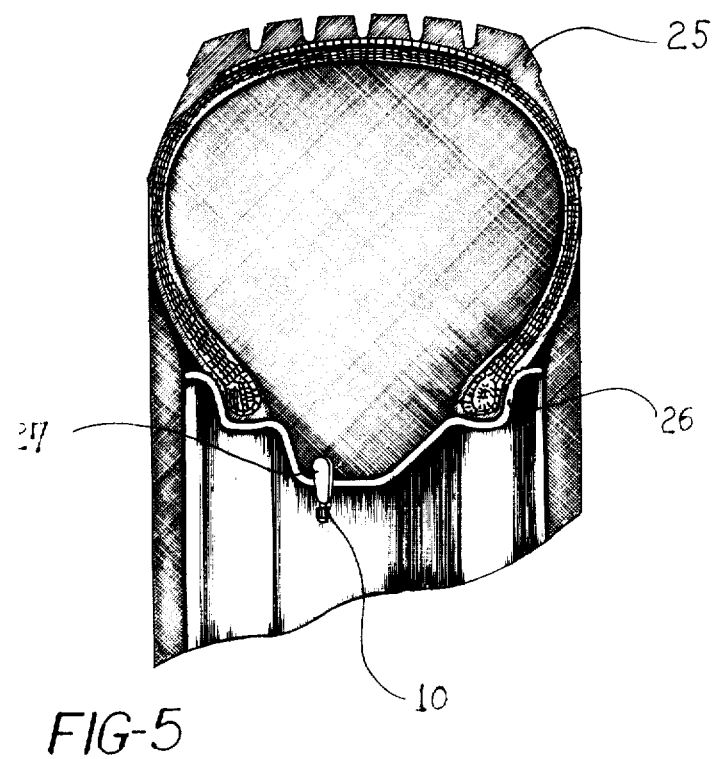
FIG. 5 is a perspective view of a tire safety device mounted in a section of the tire rim, according to the present invention.
Figure 6:
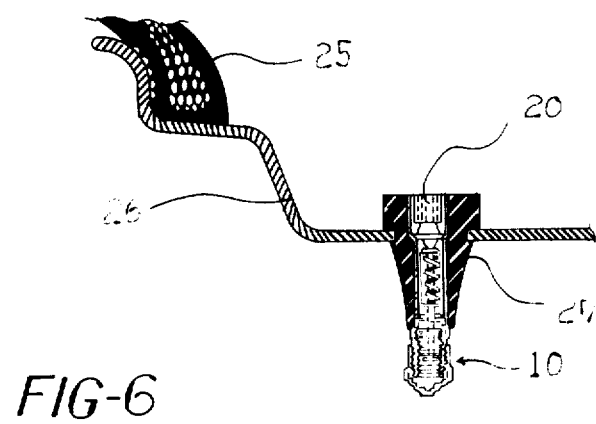
FIG. 6 is a cross-sectional view of the valve shown in FIG. 6 of the present invention.

Referring now in detail to the drawings for the purpose of illustrating the present invention, the tire safety device 10 of the present invention, as shown in FIGS. 1, 2 and 4 comprises a casing 11, an air inlet 12 within the casing 11, valve head means 18 for closing the air inlet 12.

Figure 3:
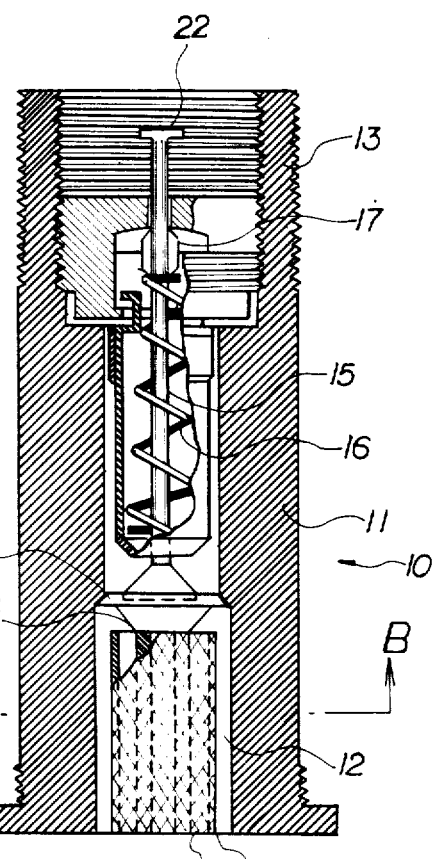
FIG. 3 is a cross-sectional view of FIG. 1, taken along lines A,A showing the valve in a closed position.

As shown in FIGS. 2 and 3, the valve head means 18 includes a lip 19 for engaging the shoulder portion 28 of the inside of the casing 11. A cylindrical weight member 20 is attached to one end of the valve head and a spring 16 is wound around a valve stem 15 whereby when the valve stem 15 is pushed from the outside at the head portion thereof 22 or the cylindrical weight member 20 pulls the valve head means 18, the lip 19 is released from the shoulder 28 for permitting air to escape from the tire 25. However, if the valve 15 is not pushed, or the speed of the vehicle falls below a predetermined speed, the lip 19 closes around the shoulder 28 so that air no longer escapes from the tire. (FIG. 3). Thus, the centrifugal force is produced on the cylindrical weight member 20 caused by the rotation of the tire works against the bias of the spring 10 to open the valve. When the centrifugal force is sufficiently reduced as a reward of reduced speed will be corresponding reduced rotation of the wheels, the force of the spring closes the valve. It is readily understood that by changing the weight of the cylindrical weight member the valve can be caused to be either opened or closed at a given speed. The cylindrical weight member 20 has a plurality of apertures 21 for passage of the air therethrough. The casing 11 is provided with a flange member 14 to facilitate vertically attachment of the valve to the rim 26. A cylindrical chamber 24 with side walls 13 are disposed at the other end of the valve through which air can be introduced. The spring 16 extends along the valve stem 15. The valve stem 15 contains a stop member 17 which holds the spring 16 in a compressed state. Thus, according to the present invention the valve system acts as a safety device to release air from the tire when the vehicle is operated at a specific speed above a predetermined speed, for example, above the legal speed limit. If the vehicle continues at the high speed, the tire will gradually become flat causing the driver a great inconvenience. Although the valve system can be applied to any number of tires, it is usually applied to either one of the front or rear wheels, preferably the rear wheel where there would be less chance for loss of control of the vehicle. In the case of an intoxicated driver and the like, the safety valve would cause him to stop the vehicle, thereby avoiding serious personal injury.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A safety air valve for a tire comprising
   a casing adapted to be vertically mounted to a rim of a tire, said casing defining an air channel extending therethrough, said air channel containing an internal shoulder which extends into said air channel,
   a valve means extending through said air channel for opening and closing the flow of air through said channel, said valve means including,
   a valve stem containing a valve head at one end thereof, said valve head being provided with a lip which is adapted to engage the shoulder in the air channel through the movement of the valve head through said air channel,
   spring means operatively associated with the valve stem to bias the valve head in closed position with the lip in engagement with said shoulder, and
   a weight member attached to said valve head whereby upon the achieving of excessive speed and correspondingly excessive tire rotation the centrifugal force on the weight member causes the valve to open against the bias of the spring.

2. The air safety valve of claim 1 wherein the weight member contains a plurality of apertures which extend therethrough.

3. The air safety valve of claim 1 wherein said valve is mounted to a tire rim.

4. The air safety valve of claim 3 wherein a tire is mounted on the tire rim.

* * * * *